United States Patent
Clark

(10) Patent No.: US 12,444,108 B2
(45) Date of Patent: Oct. 14, 2025

(54) DYNAMIC COLOR ADJUSTMENT IN AUGMENTED REALITY

(71) Applicant: Coty Inc., New York, NY (US)

(72) Inventor: Stuart Clark, Middlesex (GB)

(73) Assignee: Coty Inc., New York, NY (US)

( * ) Notice: Subject to any disclaimer, the term of this patent is extended or adjusted under 35 U.S.C. 154(b) by 240 days.

(21) Appl. No.: 18/249,029

(22) PCT Filed: Oct. 14, 2021

(86) PCT No.: PCT/US2021/055051
§ 371 (c)(1),
(2) Date: Apr. 13, 2023

(87) PCT Pub. No.: WO2022/081885
PCT Pub. Date: Apr. 21, 2022

(65) Prior Publication Data
US 2023/0394727 A1  Dec. 7, 2023

Related U.S. Application Data

(60) Provisional application No. 63/092,259, filed on Oct. 15, 2020.

(51) Int. Cl.
*G09G 5/02* (2006.01)
*G06T 7/90* (2017.01)
(Continued)

(52) U.S. Cl.
CPC ............ *G06T 11/60* (2013.01); *G06T 7/90* (2017.01); *G06T 11/001* (2013.01);
(Continued)

(58) Field of Classification Search
CPC .... G09G 5/02; G09G 2320/0666; G09G 5/06; G06F 3/04845; G06T 11/001;
(Continued)

(56) References Cited

U.S. PATENT DOCUMENTS 9,449,412 B1    9/2016  Rogers et al.
10,694,262 B1 *  6/2020  Hedman .......... H04N 21/44008
(Continued)

FOREIGN PATENT DOCUMENTS

WO    WO-2022081885 A1    4/2022

OTHER PUBLICATIONS

"International Application Serial No. PCT/US2021/055051, International Search Report mailed Jan. 28, 2022", 4 pgs.
(Continued)

*Primary Examiner* — Gordon G Liu
(74) *Attorney, Agent, or Firm* — Schwegman Lundberg & Woessner, P.A.

(57) ABSTRACT

Systems and techniques for dynamic color adjustment in augmented reality are described herein. An image of a user may be obtained from an imaging sensor. A variation between a baseline color calibration and the image of the user may be calculated. A transformation algorithm may be applied to variables of a color of an augmented reality overlay based on the variation to generate a color adjusted augmented reality overlay. The color adjusted augmented reality overlay may be transmitted to an application for overlay on an augmented reality representation of the user.

24 Claims, 4 Drawing Sheets

(51) Int. Cl.
*G06T 11/00* (2006.01)
*G06T 11/60* (2006.01)
*H04N 1/60* (2006.01)

(52) U.S. Cl.
CPC ....... *H04N 1/6027* (2013.01); *G06T 2200/24* (2013.01); *G06T 2207/30196* (2013.01)

(58) Field of Classification Search
CPC ....... G06T 11/60; G06T 7/90; G06T 2200/24; G06T 2207/30196; H04N 1/6027; H04N 1/628; H04N 1/62; G06Q 30/0643; A45D 44/005
USPC .................................................. 345/549, 594
See application file for complete search history.

(56) References Cited

U.S. PATENT DOCUMENTS

| | | | |
|---|---|---|---|
| 2003/0065255 A1 | 4/2003 | Giacchetti et al. | |
| 2014/0259048 A1* | 9/2014 | Brueck | H04N 21/6125 |
| | | | 725/32 |
| 2017/0280024 A1* | 9/2017 | Murugesan | G06T 11/60 |
| 2019/0266778 A1* | 8/2019 | Aluru | G06Q 30/0627 |
| 2019/0347840 A1* | 11/2019 | Sugaya | G09G 3/2003 |
| 2020/0242833 A1 | 7/2020 | Kuo | |
| 2020/0410772 A1* | 12/2020 | Silverstein | G06T 19/006 |

OTHER PUBLICATIONS

"International Application Serial No. PCT/US2021/055051, Written Opinion mailed Jan. 28, 2022", 8 pgs.
"International Application Serial No. PCT US2021 055051, International Preliminary Report on Patentability mailed Apr. 27, 2023", 10 pgs.

* cited by examiner

DYNAMIC COLOR ADJUSTMENT IN AUGMENTED REALITY

CLAIM OF PRIORITY

This patent application is a U.S. National Stage Filing under 35 U.S.C. 371 from International Application No. PCT/US2021/055051, filed on Oct. 14, 2021, and published as WO 2022/081885 on Apr. 21, 2022, which application claims the benefit of priority to U.S. Application Ser. No. 63/092,259, filed Oct. 15, 2020, which are incorporated by reference herein in their entirety.

TECHNICAL HELD

Embodiments described herein generally relate to color adjustment in augmented reality computing environments and, in some embodiments, more specifically to dynamic color adjustment in a virtual cosmetics try on augmented realty environment.

BACKGROUND

Color is not an intrinsic material property; the color of an object is determined by the properties of the light under which the object is observed. This has implications for cosmetic virtual try on (VTO) applications, where accurate representation of color may be desired.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
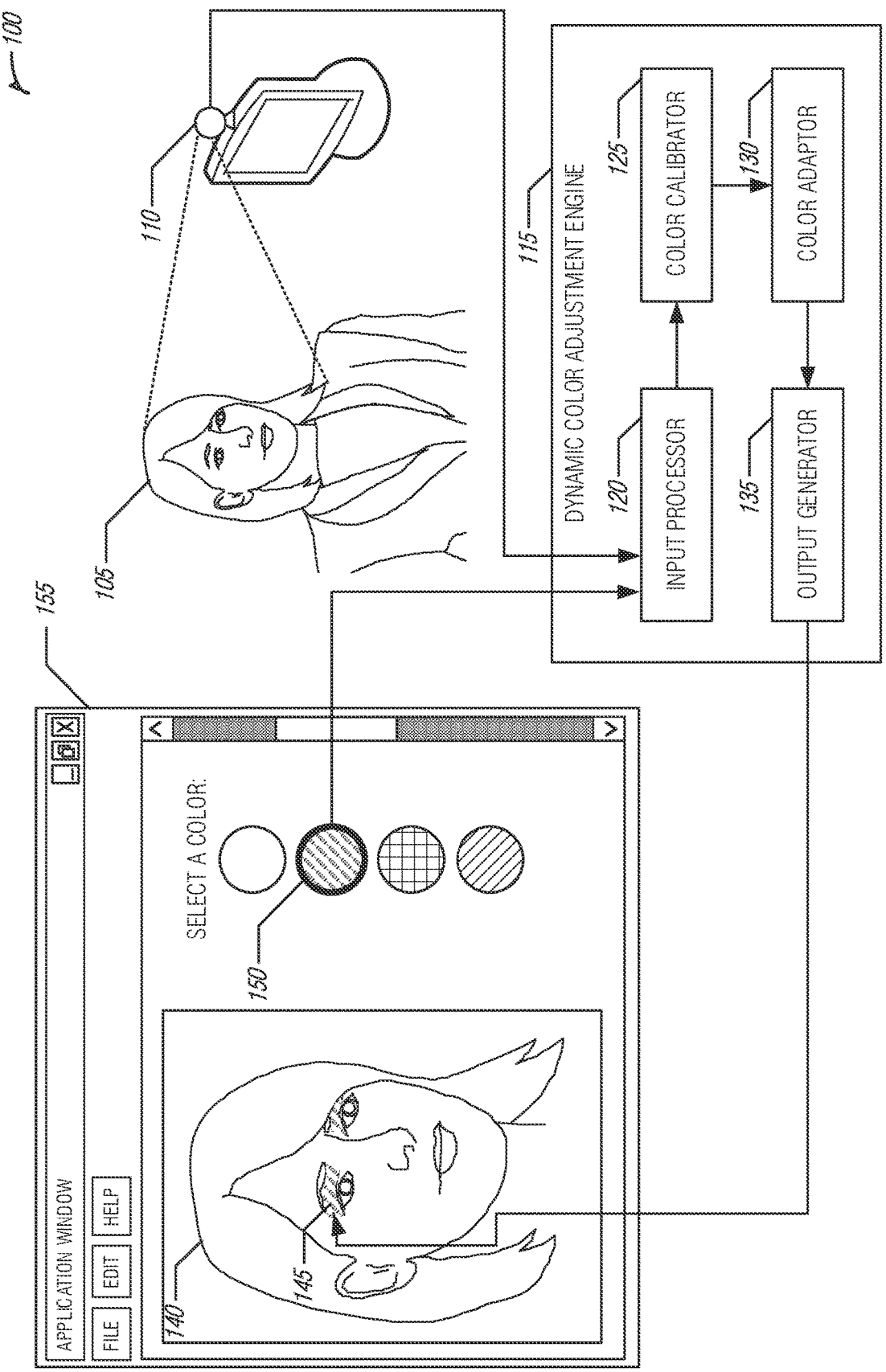
FIG. 1 is a block diagram of an example of an environment and a system for dynamic color adjustment in augmented reality, according to an embodiment.

Cosmetic Virtual Try-On (VTO) apps help consumers to see how a product would appear on their skin via the use of augmented reality. These apps work by overlaying (e.g., via masking) a predetermined color over a facial area located via facial recognition techniques (e.g., lips, brows, over-eye area, whole face, etc.) at a predetermined opacity to mimic the results of applying a cosmetic product to that area. Color is not an intrinsic material property; the color of an object is determined by the properties of the light under which the object is observed. This has implications for VTO applications (e.g., augmented reality software programs, etc.), where accuracy of result may be desirable. Traditional VTO applications use a single-color reference (e.g., a color definition defined under a specific lighting condition) for each product which is overlaid onto the face of an application user so that the user may evaluate the suitability of the product.

Use of a single-color reference may lead to inaccuracies as color is not an intrinsic material property—the color of an object is determined by the properties of the light under which the object is observed. For VTO applications, this may lead to inaccurate representation of color on the skin of a consumer because of a mismatch between the ambient lighting conditions present when the application is being used and the lighting conditions originally used to evaluate the product color. If the lighting conditions under which the application is being used do not match those used by the application developer to evaluate the color of the products, this will lead to the application portraying inaccurate color results, potentially leading to dissatisfaction when the consumer purchases the product. The solution discussed herein may be especially beneficial for product categories where a specific color match is critical to product acceptance, such as cosmetic products, and particularly foundations.

The solution discussed herein assesses the ambient lighting conditions and adjusts the virtual product color so that it appears realistic when the application is used under a range of lighting conditions. A variable definition of color is used for each VTO product which is defined on the basis of the ambient lighting conditions present. The systems and techniques discussed herein improve the accuracy of virtual try on applications for makeup. These applications work by overlaying (via masking) a predetermined color over a facial area located via facial recognition techniques (e.g., lips, brows, over-eye area, whole face, etc.) at a predetermined opacity to mimic the results of applying a cosmetic product to that area.

Consumers want to know how makeup will actually look under a variety of lighting conditions (e.g., daylight, at home, at work, etc.) and this is not possible with conventional VTO techniques. This is because either a) white-balancing is used to normalize the ambient lighting to one that approximates the reference illumination originally used to evaluate a color of a product (in which case the user is not seeing their own appearance as it would be under the current ambient lighting) or b) white-balancing is not used and so although the appearance of the user is faithful to the ambient lighting, unless the ambient lighting is coincidentally similar to the reference illumination originally used to evaluate the product's color, the product color portrayed is not accurate under the ambient lighting conditions. Thus, conventional VTO techniques either use white balancing to standardize the user's appearance to a constant ambient lighting in an attempt to increase the accuracy of the invariant overlaid color, or they don't use white balance and overlay an invariant color irrespective of the ambient lighting. A disadvantage of the former is that consumers can't actually evaluate the performance of the product under a range of lighting conditions because they are seeing a color corrected version of themselves. A disadvantage of the latter approach is that it may result in wildly inaccurate representations of product color because the overlaid color is not correct under the ambient lighting conditions.

The systems and techniques address these shortcomings of conventional VTO techniques by modifying the product's color based on the ambient lighting conditions rather than using a single-reference color resulting in improved color accuracy whether or not white balancing is used. By modifying the product color to reflect how the product would appear in the ambient lighting conditions present, a truer representation of the appearance of a product may be presented under a range of lighting conditions chosen by the user enabling more informed purchasing decisions.

Additionally, other image manipulation processes (such as blurring) may also be applied to mimic other visual effects of cosmetic products. These applications use a single-color definition (defined under a specific lighting condition) for each product, and this color is used in the overlay process irrespective of the ambient lighting conditions that the application is being used in, leading to inaccurate results in many instances. If the user is making purchasing decisions based off this color portrayal, it may lead to dissatisfaction, as the actual color product may not meet the user's expectations. A benefit of this solution is that the color of the product being overlaid on the facial features of the user is adjusted according to the ambient lighting conditions, and hence the application gives a realistic portrayal of the actual result the consumer would experience if using and evaluating the color of the product under those lighting conditions. This gives the user more confidence to purchase and she is more likely to be satisfied with the purchase (as the shade is more likely to match her expectations).

Conventional techniques for addressing lighting effects include providing a warning when the lighting conditions are too light or too dark for the application to operate well. Alternatively, or in addition, conventional VTO systems may compensate for light level and color temperature by virtue of the fact that the camera devices are using white balance to correct the whole image prior to overlaying the virtual product. This may be thought of as the camera trying to correct for the lighting conditions and representing the user in a standardized lighting condition over which the product color is overlaid. However, this means that the consumer often cannot view themselves in the actual ambient lighting conditions they are in because the camera is making image corrections to account for the ambient lighting conditions.

The solution discussed herein assesses the lighting level, as well as the color temperature of the ambient lighting conditions, and adjusts the color of the product accordingly such that it may then be overlaid onto facial features, creating an accurate representation of the use of the product under the prevailing light conditions. The solution discussed herein performs: 1) an evaluation of the ambient lighting conditions and 2) an adjustment of the product color from standardized lighting conditions to the ambient lighting conditions.

The evaluation of ambient lighting conditions involves lighting calibration. This may be a feature of skin tone analysis. The evaluation my analyze the ambient lighting conditions to evaluate skin tone. Otherwise the algorithm does not know whether the users skin tone is light but viewed under dim lighting or dark and viewed under bright lighting, or if a yellow-hued skin tone is real or an effect caused by warm (e.g., tungsten, etc.) lighting. The lighting calibration may be performed via analysis of an image of an object of known color taken under the prevailing lighting conditions. The object may be a color calibration card consisting of a number of accurately printed colors, or an everyday object with an acceptable color tolerance (e.g., a white sheet of printer paper, etc.). There are a number of techniques for color calibration including: a) using a color calibration card (but this is burdensome in terms of time, cost and effort), b) calibrating by taking an image of a white piece of paper (this is how color temperature determining applications for photographers may work), c) ask the user to do a one-time calibration in cloudy sunlight with no makeup, and determine her reference skin tone and in future sessions, evaluate lighting conditions by evaluating her skin tone against the reference, and estimating prevailing lighting conditions, d) using typical white balancing algorithms employed by camera software (e.g., gray world assumption, Retinex, or other more advanced processes). Rather than using this info to correct the base image, the base image is unadjusted (or maybe adjusted for lightness level) and instead the white balancing info is used to change the product color.

Adjustment of the product color from standardized lighting conditions to the ambient lighting conditions involves using the color calibration information to calculate the correct color of the product to be virtually applied, under the prevailing lighting conditions. This may be done through application of a color adaptation transform (e.g., the Bradford or von Kries transform, etc.), but may also be achieved via any suitable linear or non-linear transformation of color values in various color space systems, including but not limited to RGB, XYZ, HSL, HSV, CIE LAB color spaces. This will produce the corrected color that may be used for the overlay. In the case where the device being used is a mobile phone or tablet, an ambient light level sensor present in many such devices may be used to further modify the lightness level of the color to counter any sudden changes in lighting level (e.g., if the application user is moving while using the product and experiencing changes in lighting level, etc.).

FIG. 1 is a block diagram of an example of an environment 100 and a system 115 for dynamic color adjustment in augmented reality, according to an embodiment. The environment 100 may include a user 105 of a virtual try on (VTO) application 155. The VTO application may provide an augmented reality representation of the user 140 captured from an imaging device 110 that is communicatively coupled (e.g., via the internet, wireless network, shared bus, wired network, shortwave radio, etc.) to the VTO application 155. For example, the user 105 may choose to overlay 145 an eyeshadow on the augmented reality representation of the user 140 by selecting color 150.

The VTO application 155 may be operating on a computing device (e.g., a single computing device, a cluster of computing devices, a cloud computing platform, a mobile device, a web server, etc.). The VTO application may be coupled to the system 115. In an example, the system 115 may be a dynamic color adjustment engine. The system 115 may include a variety of components including an input processor 120, a color calibrator 125, a color adaptor 130, and an output generator 135. The system 115 may dynamically adjust the color of the overlay 145 to compensate for ambient lighting affecting the environment 110.

The input processor 120 may obtain the selection of the color 150 and output from the imaging device 110. For example, an image of the user, an image of a calibration device, etc. may be obtained by the input processor 120 from the imaging device 110.

A color calibration routine may be completed by the system 115 using the color calibrator 125. In an example, the color calibrator may receive an image of a calibration device from the input processor 120 and may establish offset for color variables based on an evaluation of the image of the calibration device against a baseline color calibration. In another example, the color calibrator 125 may receive an image of the user 105 under specified lighting conditions and a may establish a baseline color calibration based on the image. The color calibrator 125 may receive a subsequent image of the user 105 and may evaluate the subsequent image of the user 105 using the baseline calibration to establish offsets for color variables.

The color adaptor 130 may receive offsets or other color variable information from the color calibrator 125 and may adapt the color 150 using a transform algorithm to adjust the color 150 based on the ambient lighting of the user 105 captured by the imagining device 110. In an example, the color adaptor may use the Bradford transform to adapt the color 150.

The color adaptor 130 may provide the adapted color 150 to the output generator 135. The output generator 135 may translate the color adaptation into computer commands that may be passed to the VTO application 155. The VTO application 155 may then display the adapted color as the overlay 145 on the augmented reality representation of the user 140 providing the user 105 with an accurate augmented reality representation of herself with the eyeshadow applied under the existing ambient lighting conditions.

Figure 2:
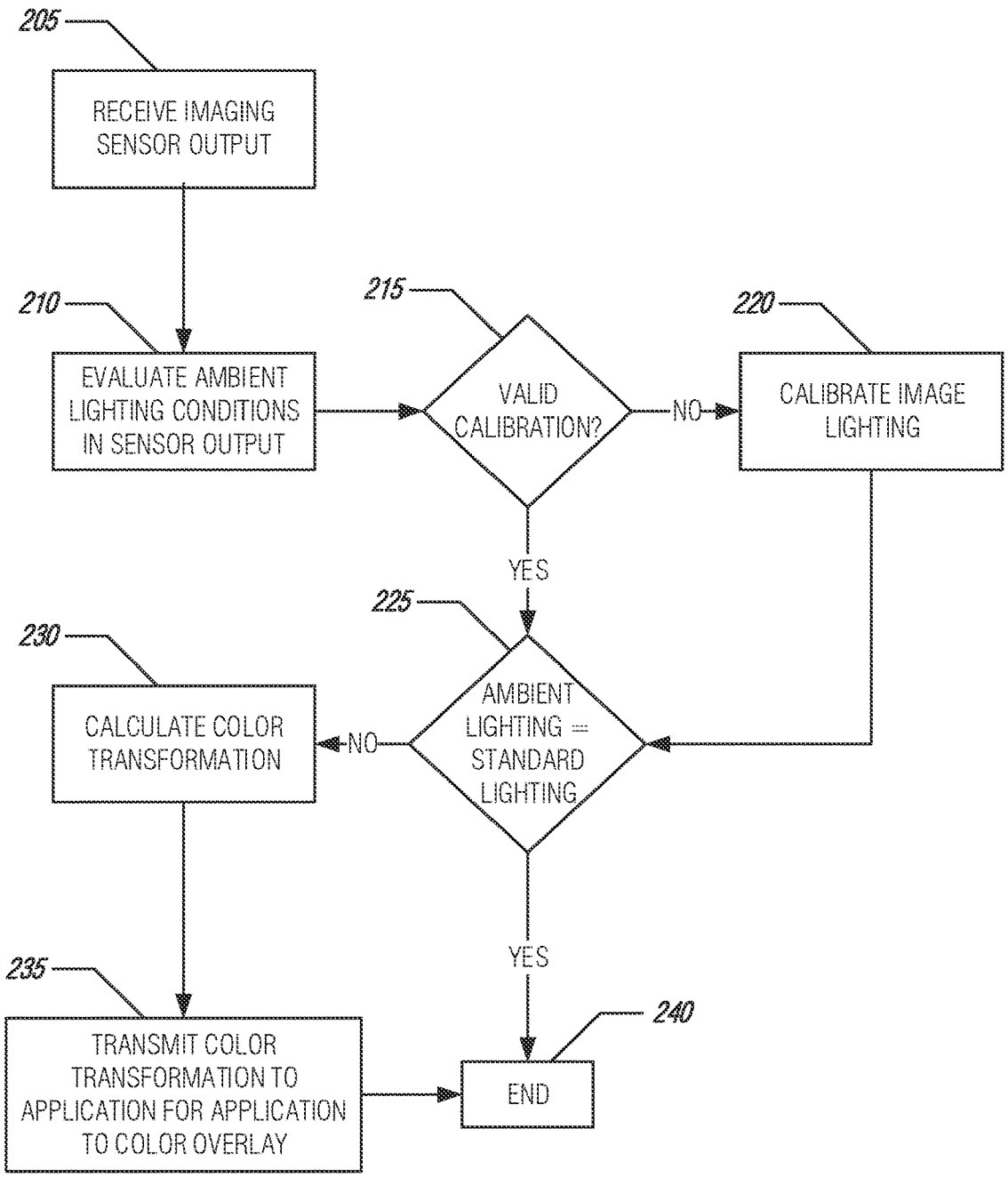
FIG. 2 illustrates a flow diagram of an example of a process for dynamic color adjustment in augmented reality, according to an embodiment.

FIG. 2 illustrates a flow diagram of an example of a process 200 for dynamic color adjustment in augmented reality, according to an embodiment. The process 200 may provide features as described in FIG. 1.

At operation 205 imaging sensor output is received (e.g., by the input processor 120 as described in FIG. 1, etc.). At operation 210, ambient lighting conditions are evaluated (e.g., by the color calibrator 125 as described in FIG. 1, etc.). At decision 215, it is determined (e.g., by the color calibrator 125, etc.) if there is a valid calibration. If not, a calibration routine is initiated at operation 220. When there is a valid calibration, at decision 225 it is determined if ambient lighting is equal to standard lighting. For example, no transformation may be necessary if the ambient lighting is equal to a calibration baseline.

If the ambient lighting is equal to the standard lighting, the process 200 ends at 240. If there is a variation between the ambient lighting and the standard lighting, at operation 230 a color transformation is calculated (e.g., by the color adaptor 230 as described in FIG. 1, etc.). At operation 235, the color transformation is transmitted to an application for application to a color overlay (e.g., by the output generator 235 as described in FIG. 1, etc.). The process 200 then ends at 240.

Figure 3:
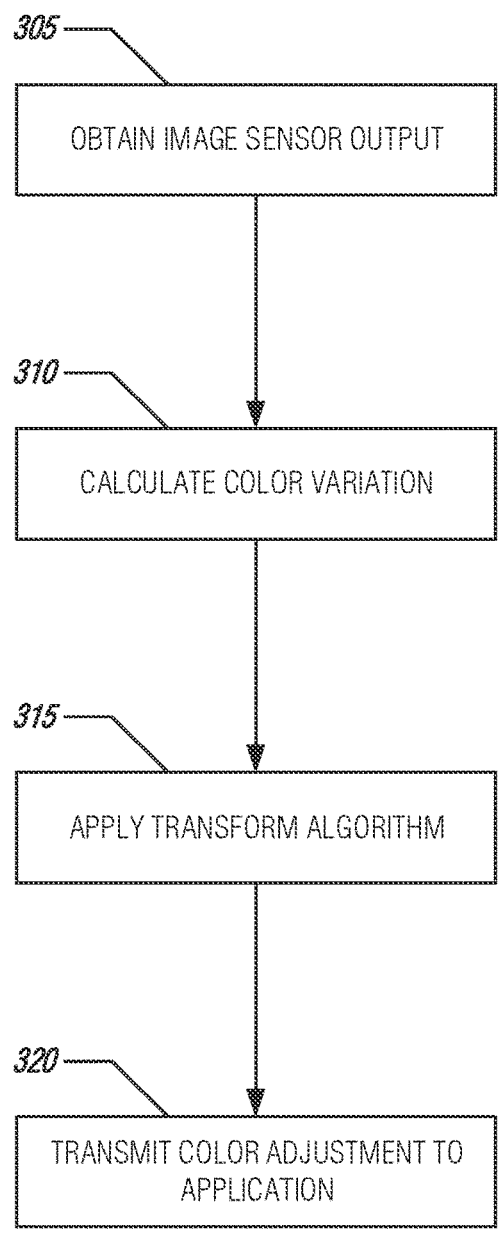
FIG. 3 illustrates an example of a method for dynamic color adjustment in augmented reality, according to an embodiment.

FIG. 3 illustrates an example of a method 300 for dynamic color adjustment in augmented reality, according to an embodiment. The method 300 may provide feature as described in FIGS. 1 and 2.

At operation 305, an image of a user may be Obtained (e.g., by the input processor 120 as described in FIG. 1, etc.) from an imaging sensor. At operation 310, a variation between a baseline color calibration and the image of the user may be calculated (e.g., by the color calibrator 125 as described in FIG. 1, etc.). At operation 315, a transformation algorithm may be applied (e.g., by the color adaptor 135 as described in FIG. 1, etc.) to variables (e.g., saturation, tone, brightness, contrast, lightness, hue, chroma, tristimulus values, RGB values, etc.) of a color of an augmented reality overlay based on the variation to generate a color adjusted augmented reality overlay. At operation 320, the color adjusted augmented reality overlay may be transmitted (e.g., by the output generator 135 as described in FIG. 1, etc.) to an application for overlay on an augmented reality representation of the user.

Figure 4:
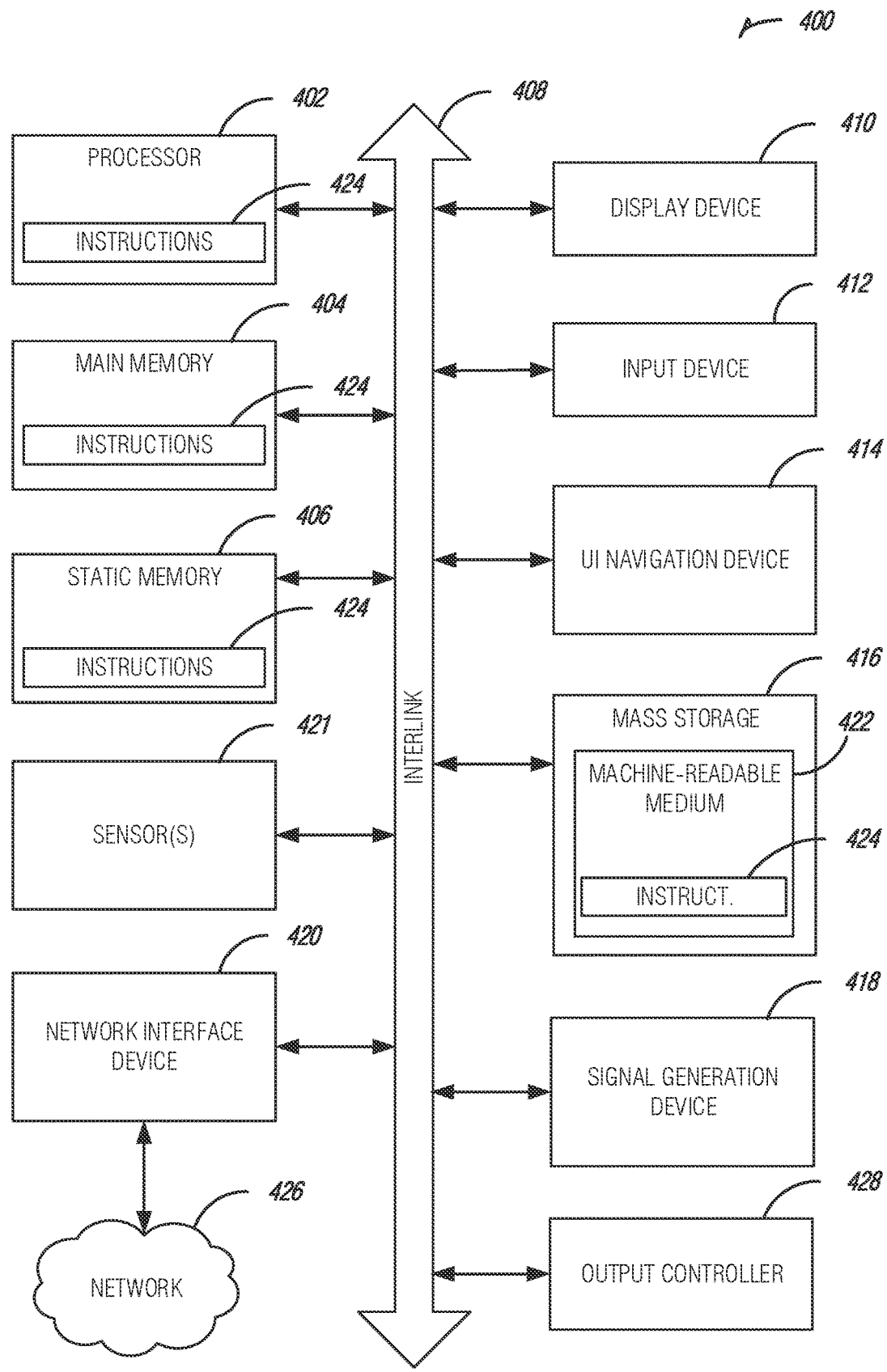
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensors. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (IMP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MIMO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

in this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for dynamic color adjustment in augmented reality comprising:
at least one processor; and
memory including instructions that, when executed by the at least one processor, cause the at least one processor to perform operations to:
obtain an image of a user from an imaging sensor;
calculate a variation between a baseline color calibration and the image of the user using an image capture of a calibration device present in an environment of the user, wherein the calibration device is a color calibration card comprising a plurality of colors;
generate an offset based on the variation;
apply a transformation algorithm to variables of a color of an augmented reality overlay using the offset to generate a color adjusted augmented reality overlay; and
transmit the color adjusted augmented reality overlay to an application for overlay on an augmented reality representation of the user, the augmented reality representation being applied to the image of the user, the image of the user being an uncorrected image.

2. The system of claim 1, the memory further comprising instructions that, when executed by the at least one processor, cause the at least one processor to perform operations to:
evaluate ambient light conditions of the image of the user to determine a skin tone of the user; and
calibrate the image of the user based on the skin tone, wherein the variation is calculated between the baseline color calibration and the calibrated image of the user.

3. The system of claim 1, the memory further comprising instructions that, when executed by the at least one processor, cause the at least one processor to perform operations to:
obtain a calibration image from the imaging sensor; and
evaluate attributes for the calibration image using expected calibration image attribute values to determine the baseline color calibration.

4. The system of claim 1, the memory further comprising instructions that, when executed by the at least one processor, cause the at least one processor to perform operations to:
generate a user interface for display on a user computing device that includes lighting configuration instructions;
in response to receipt of an acknowledgment via the user interface, capture a calibration image from the imaging sensor; and
evaluate attributes for the calibration image using expected calibration image attribute values to determine the baseline color calibration.

5. The system of claim 1, the memory further comprising instructions that, when executed by the at least one processor, cause the at least one processor to perform operations to:
generate a user interface for display on a user computing device that includes the image of the user;
identify a product to be applied to the image of the user;
determine an application area for the product on the image of the user; and
output the color adjusted augmented reality overlay on the application area of the image of the user.

6. The system of claim 1, wherein the variables include one or more of a saturation value, tone value, a brightness value, a contrast value, a lightness value, a hue value, a chroma value, tristimulus values, or red green blue (RGB) values.

7. The system of claim 1, wherein the image of the user is a video stream and the color adjusted augmented reality overlay is applied to the video stream.

8. The system of claim 1, wherein the application is a virtual try on application that includes selectable user interface elements for products that, when selected by the user, apply a selected product to the augmented reality representation of the user.

9. The system of claim 1, wherein the imaging sensor is included with a mobile computing device of the user.

10. The system of claim 1, wherein the imaging sensor is included in a tablet computing device of the user.

11. The system of claim 1, the memory further comprising instructions that, when executed by the at least one processor, cause the at least one processor to perform operations to:
identify a lighting change in the image of the user;
calculate a second variation between the transformed variables and the image of the user; and
regenerate the color adjusted augmented reality overlay based on the second variation.

12. The system of claim 1, the memory further comprising instructions that, when executed by the at least one processor, cause the at least one processor to perform operations to:
determine white balance information for the image of the user, wherein the color adjusted augmented reality overlay is generated at least in part based on the white balance information.

13. A method for dynamic color adjustment in augmented reality comprising:
obtaining an image of a user from an imaging sensor;
calculating a variation between a baseline color calibration and the image of the user using an image capture of a calibration device present in an environment of the user, wherein the calibration device is a color calibration card comprising a plurality of colors;
generating an offset based on the variation;
applying a transformation algorithm to variables of a color of an augmented reality overlay using the offset to generate a color adjusted augmented reality overlay; and
transmitting the color adjusted augmented reality overlay to an application for overlay on an augmented reality representation of the user, the augmented reality representation being applied to the image of the user, the image of the user being an uncorrected image.

14. The method of claim 13, further comprising:
evaluating ambient light conditions of the image of the user to determine a skin tone of the user; and
calibrating the image of the user based on the skin tone, wherein the variation is calculated between the baseline color calibration and the calibrated image of the user.

15. The method of claim 13, further comprising:
obtaining a calibration image from the imaging sensor; and
evaluating attributes for the calibration image using expected calibration image attribute values to determine the baseline color calibration.

16. The method of claim 13, further comprising:
generating a user interface for display on a user computing device that includes lighting configuration instructions;
in response to receiving an acknowledgment via the user interface, capturing a calibration image from the imaging sensor; and
evaluating attributes for the calibration image using expected calibration image attribute values to determine the baseline color calibration.

17. The method of claim 13, further comprising:
generating a user interface for display on a user computing device that includes the image of the user;
identifying a product to be applied to the image of the user;
determining an application area for the product on the image of the user; and
outputting the color adjusted augmented reality overlay on the application area of the image of the user.

18. The method of claim 13, wherein the variables include one or more of a saturation value, tone value, a brightness value, a contrast value, a lightness value, a hue value, a chroma value, tristimulus values, or red green blue (RGB) values.

19. The method of claim 13, wherein the image of the user is a video stream and the color adjusted augmented reality overlay is applied to the video stream.

20. The method of claim 13, wherein the application is a virtual try on application that includes selectable user interface elements for products that, when selected by the user, apply a selected product to the augmented reality representation of the user.

21. The method of claim 13, wherein the imaging sensor is included with a mobile computing device of the user.

22. The method of claim 13, wherein the imaging sensor is included in a tablet computing device of the user.

23. The method of claim 13, further comprising:
identifying a lighting change in the image of the user;
calculating a second variation between the transformed variables and the image of the user; and
regenerating the color adjusted augmented reality overlay based on the second variation.

24. The method of claim 13, further comprising:
determining white balance information for the image of the user, wherein the color adjusted augmented reality overlay is generated at least in part based on the white balance information.

* * * * *